United States Patent [19]
Tajima et al.

[11] Patent Number: 5,829,481
[45] Date of Patent: Nov. 3, 1998

[54] PRESSURE-CONTROL VALVE MOUNTED ON A BASE-MOUNT SELECTOR VALVE

[75] Inventors: Masamichi Tajima; Takashi Akimoto; Hiroyuki Katsuta, all of Yawara-mura, Japan

[73] Assignee: SMC Corporation, Tokyo, Japan

[21] Appl. No.: 892,171

[22] Filed: Jul. 14, 1997

[30] Foreign Application Priority Data

Aug. 1, 1996 [JP] Japan ..................................... 8-219405

[51] Int. Cl.$^6$ .......................... F15B 13/043; G05D 16/10
[52] U.S. Cl. .................. 137/884; 137/116.5; 137/625.64
[58] Field of Search ........................... 137/116.5, 625.64, 137/884

[56] References Cited

U.S. PATENT DOCUMENTS

| | | | |
|---|---|---|---|
| 3,513,876 | 5/1970 | Tarbox | ..................................... 137/596 |
| 4,267,862 | 5/1981 | Neff et al. . | |
| 4,453,565 | 6/1984 | Neff . | |
| 4,770,210 | 9/1988 | Neff et al. . | |

FOREIGN PATENT DOCUMENTS 2 125 903   3/1984   United Kingdom .

OTHER PUBLICATIONS

English Abstract of European Pub. No. 09100922, Published Apr. 15, 1997.

*Primary Examiner*—Gerald A. Michalsky
*Attorney, Agent, or Firm*—Oblon, Spivak, McClelland, Maier, & Neustadt,P.C.

[57] ABSTRACT

A pressure-control valve mounted so as to be directly positioned between a selector valve 3 and a base 2 comprising a valve body 15 with almost the same lateral width as the selector valve 3, with the body 15 including therein a plurality of communication passages allowing the passage holes in the selector valve 3 to communicate with the corresponding passage holes in the base 2; a pressure-control valve hole 19 disposed so as to cross the communication passages; a pressure-control valve rod 20 inserted into the valve hole; and a means cooperating with the pressure-control valve rod 20 to adjust the air pressure to a set value.

15 Claims, 9 Drawing Sheets

FIG. 11
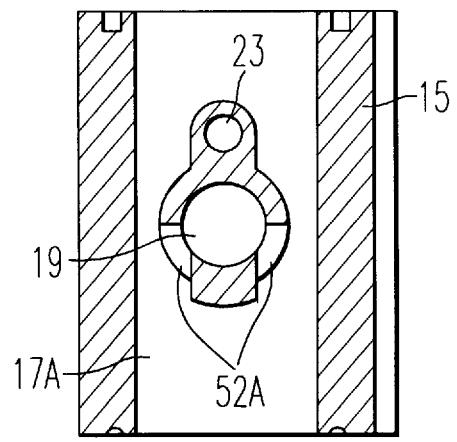
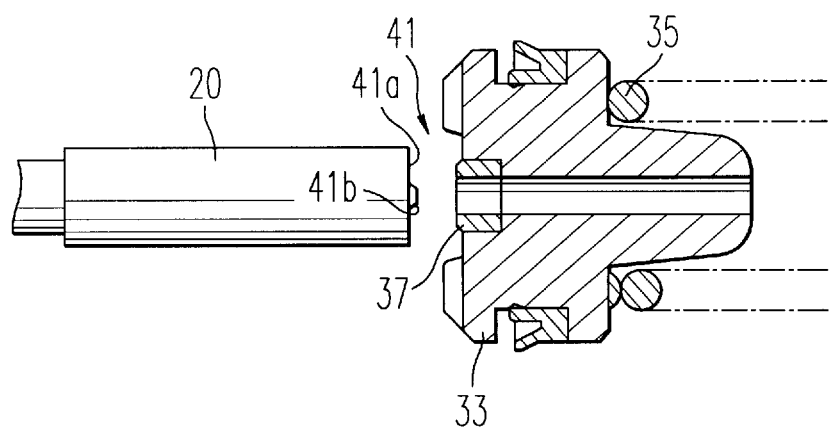
FIG. 13

PRESSURE-CONTROL VALVE MOUNTED ON A BASE-MOUNT SELECTOR VALVE

FIELD OF THE INVENTION

The present invention relates to a pressure-control valve that is mounted on a base-mount selector valve to adjust the fluid pressure output from the selector valve to a required value.

Prior Art

When a pressurized fluid such as compressed air supplied through a selector valve is used to drive fluid-pressure equipment, the fluid pressure supplied to the fluid-pressure equipment may have to be controlled, according to the set pressure and operation conditions of the equipment. To control the fluid pressure, a pressure-control valve is normally mounted in the piping that connects the output port of the selector valve to the fluid-pressure equipment.

However, because commonly used pressure-control valves are generally large, when such a pressure-control valve is connected to the selector valve through piping, the piping operation is very cumbersome and a large installation space is required. Such a problem is particularly likely to occur when multiple selector valves are installed on a base member such as a manifold or subplate with piping ports, and when as many pressure-control valves as selector valves must be connected. In some cases, the mounting of the pressure-control valves is difficult due to the large number of selector valves used. This has recently become a particularly serious problem due to the reduced size of selector valves.

Disclosure of the Invention

It is a main object of this invention to provide a small pressure-control valve that can be simply and compactly mounted on a base-mount selector valve without the use of piping.

It is another object of this invention to provide a pressure-control valve of a reasonable design and structure comprising a small valve body incorporating a plurality of channels and pressure-control valve mechanisms.

To achieve these objects, this invention provides a small pressure-control valve that can be installed so as to be directly positioned between a selector valve for switching the direction of the flow of a pressurized fluid and a base for supplying a pressurized fluid to the selector valve.

The valve body of the pressure-control valve has almost the same lateral width as the selector valve so as to be mounted between the selector valve and the base without laterally protruding therefrom.

A closable communication passage that allows a set of passage holes in the selector valve to communicate with a set of corresponding passage holes in the base via a pressure-control valve seat and direct communication passages that allow the other corresponding passage holes in the selector valve and the base to directly communicate with each other are disposed inside the valve body in parallel, and a pressure-control valve hole is disposed so as to cross the closable and the direct communication passages, with a pressure-controlling valve rod inserted into the pressure-control valve hole.

The pressure-control valve hole is in communication with the closable communication passage but not with the direct communication passages, and penetrates the direct communication passages without completely blocking them and with a required channel cross-section remaining.

A pressure-control chamber installed at one end of the pressure-control valve rod includes a pressure-control piston and a pressure-control spring, and a return chamber at the other end of the pressure-control valve rod includes a return spring. A pressure-control passage that allows the pressure-control and the return chambers to communicate with each other is disposed in parallel to the pressure-control valve hole.

Furthermore, the valve body includes a connecting channel for guiding a pressurized fluid for pressure control to the pressure-control chamber.

The pressure-control valve of this configuration effectively uses the internal space because the plurality of communication passages that allow the passage holes in the selector valve to communicate with the corresponding passage holes in the base, as well as the pressure-control valve hole that accommodates the pressure-control valve rod, are disposed inside the valve body in positions that enable their functions to be combined. Consequently, the lateral width of the valve body may generally be as small as that of the selector valve. As a result, the pressure-control valve can be compactly mounted within the width of the selector valve so as to be directly positioned between the selector valve and the base. Thus, even if a plurality of selector valves are mounted on the base, the pressure-control valve can be simply connected to each selector valve.

According to the preferred embodiment of this invention, the pressure-control valve hole and the pressure-control passage are formed adjacent to each other in the flow direction of the communication passages. This configuration can prevent the channel cross-section area from being reduced in size compared to the case in which the pressure-control valve hole and the pressure-control passage are disposed in parallel in the width direction of the communication passages, thereby enabling a required channel cross-section to be reliably obtained.

According to a specific embodiment of this invention, the closable communication passage is a supply channel for supplying a pressurized fluid to the selector valve from a supply port in the base, and comprises a first portion that is in communication with the supply passage hole in the base and that is opened into the valve hole; and a second portion that is in communication with the supply passage hole in the selector valve and that is opened into the valve hole at a position different from that in the first portion, with the pressure-control valve seat installed between the first and the second portions.

In one example of this invention, the connecting channel is formed by the gap between the pressure-control valve rod and the pressure-control valve hole, and the second portion of the closable communication passage is in communication with the pressure-control chamber or the return chamber through this gap.

In another example of this invention, the connecting channel is formed by a connecting hole that allows the second portion of the closable communication passage to directly communicate with the pressure-control passage.

In yet another example of this invention, the connecting passage comprises a connecting hole that allows an output passage hole in the selector valve to communicate with the interior of the pressure-control valve hole; and the connecting passage also comprises the gap in the outer circumference of the pressure-control valve rod, with the gap allowing the connecting hole to communicate with the pressure-control or the return chamber. In this case, if the pressure-control valve includes an output direct-communication passage that connects the output passage hole in the base to the corresponding output passage hole in the selector valve, the connecting hole is formed in this output direct-communication passage.

In this invention, the part of the gap in the outer circumference of the pressure-control valve rod that does not constitute the connecting channel is sealed by a seal member attached to the pressure-control valve rod. In this case, the seal member desirably comprises a lip seal member having a directional seal so that, during a return operation, the pressurized fluid in the pressure-control chamber or the return chamber can push the seal member open and be ejected toward the first portion of the closable communication passage.

BRIEF DESCRIPTION OF THE DRAWINGS

FIG. 11 is a cross-sectional view taken along line VII—VII in FIG. 10.

FIG. 13 shows the configuration of a relief means that is preferably applicable to a control valve according to this invention.

DETAILED INVENTION

Figure 1:
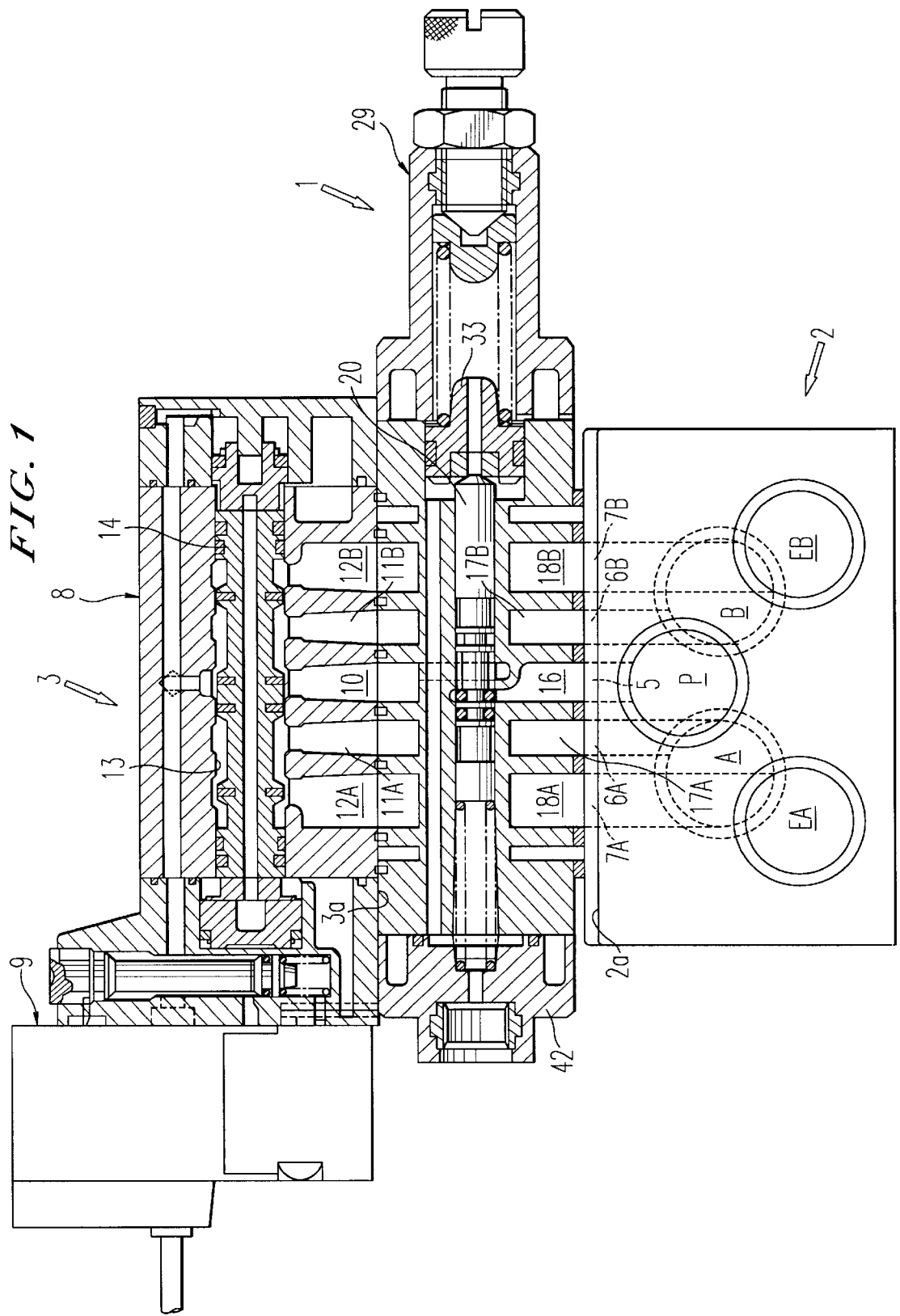
FIG. 1 is a vertical cross-sectional view showing a pressure-control valve according to the first embodiment mounted between the base and the selector valve.

FIG. 1 shows a pressure-control valve 1 according to this invention directly mounted between a base 2 and a selector valve 3, with these parts 1, 2, and 3 fixed to one another by a mounting means such as screws (not shown).

The base 2 generally represents a member such as a manifold or a subplate and is adapted to include one or more selector valves. The base 2 in this figure is a unitary base on which a single selector valve 3 is mounted. The base 2 includes a supply port P, a first ejection port EA, and a second ejection port EB for compressed air on one of its sides, and a first output port A and a second output port B on the other side. In addition, a flat control-valve mounting plate 2a is installed on the top surface of the base 2, with a supply passage hole 5, a first output passage hole 6A, a second output passage hole 6B, a first ejection passage hole 7A, and a second ejection passage hole 7B opened in parallel in the mounting plate 2a.

The selector valve 3 is a single-pilot type including a main valve section 8 and a solenoid-operated pilot valve section 9. The main valve section 8 includes a flat control-valve mounting plate 3a on the bottom surface of the valve body, with a supply passage hole 10, a first output passage hole 11A, a second output passage hole 11B, a first ejection passage hole 12A, and a second ejection passage hole 12B opened in parallel in the mounting plate 3a. In addition, a valve hole 13 into which each of the passage holes is opened is formed inside the valve body, with a valve rod 14 slidably inserted into the valve hole 13 in an airtight manner.

When a solenoid is energized to output a pilot fluid from the pilot valve section 9 to the main valve section 8, the valve rod 14 is moved to the right in the figure to allow the supply passage hole 10 to communicate with the first output passage hole 11A, while allowing the second output passage hole 11B to communicate with the second ejection passage hole 12B. In addition, when the solenoid is de-energized, the pilot fluid is ejected from the main valve section 8 to cause the internal pilot fluid being supplied to the chamber disposed opposite the pilot valve section to return the valve rod 14 to the illustrated condition, thereby allowing the supply passage hole 10 to communicate with the second output passage hole 11B while allowing the first output passage hole 11A to communicate with the first ejection hole 12A.

The selector valve 3, however, is not limited to the illustrated single-pilot-type selector valve, but may be a double-pilot selector valve or a direct-operated selector valve.

Figure 2:
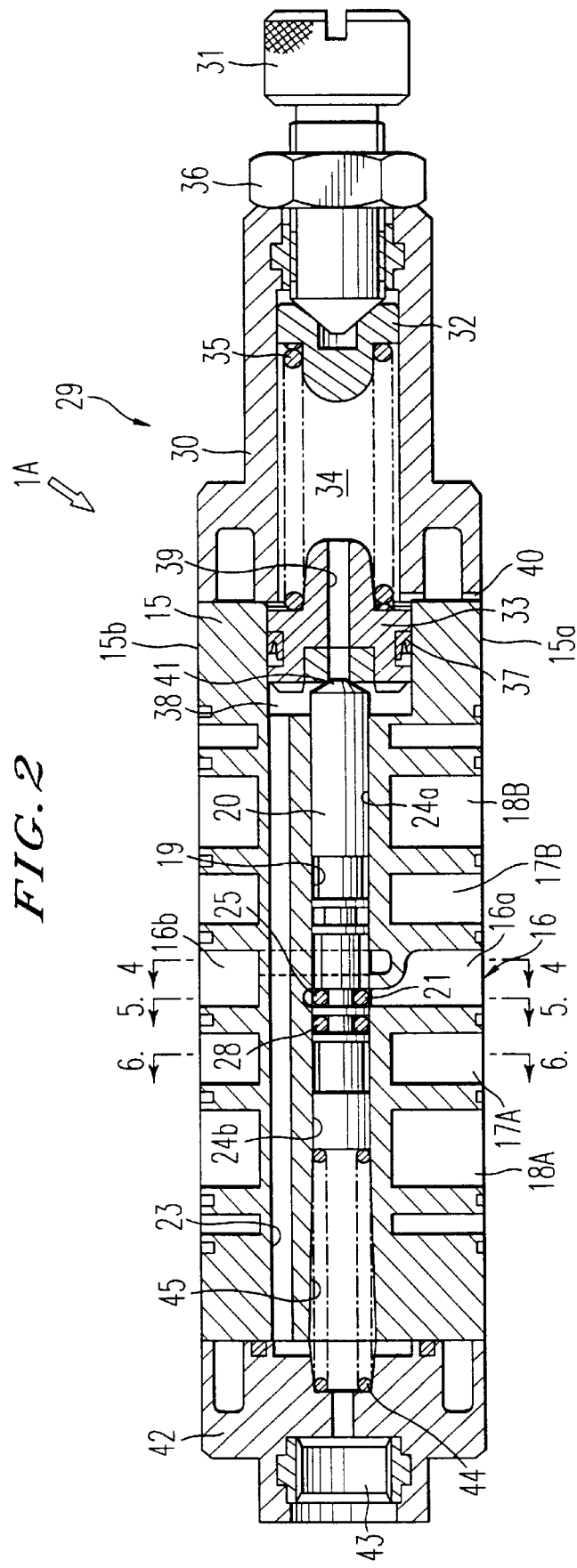
FIG. 2 is an enlarged view of the pressure-control valve according to the first embodiment.

As shown in detail, in FIG. 2, the pressure-control valve 1A in the first embodiment includes a long valve body 15 having a rectangular cross-section and a lateral width almost the same as that of the valve body of the selector valve 3. The top and bottom surfaces of the valve body 15 comprise flat mounting surfaces 15a and 15b on which the base 2 and the selector valve 3 are mounted, respectively, and these mounting surfaces allow the valve body to be directly positioned between the base 2 and the selector valve 3.

Inside the valve body 15, a plurality of communication passages 16, 17A, 17B, 18A, and 18B connecting the passage holes in the selector valve 3 to the corresponding passage holes in the base 2 are formed between the mounting surfaces 15a and 15b, and a pressure-control valve hole 19 is formed so as to cross these communication passages with a pressure-control valve rod 20 movably inserted into the valve hole 19.

Among the plurality of communication passages 16, 17A, 17B, 18A, and 18B, the supply communication passage 16 connecting the supply passage hole 5 in the base 2 to the supply passage hole 10 in the selector valve 3 is a closable passage that has a pressure-control valve seat 25 in the middle, and the output communication passages 17A and 17B connecting the output passage holes 6A, 6B and 11A, 11B together, respectively, and the communication passages 18A and 18B for ejection connecting the ejection passage holes 7A, 7B and 12A, 12B together, respectively, are direct communication passages that directly connect these passage holes.

Figure 3:
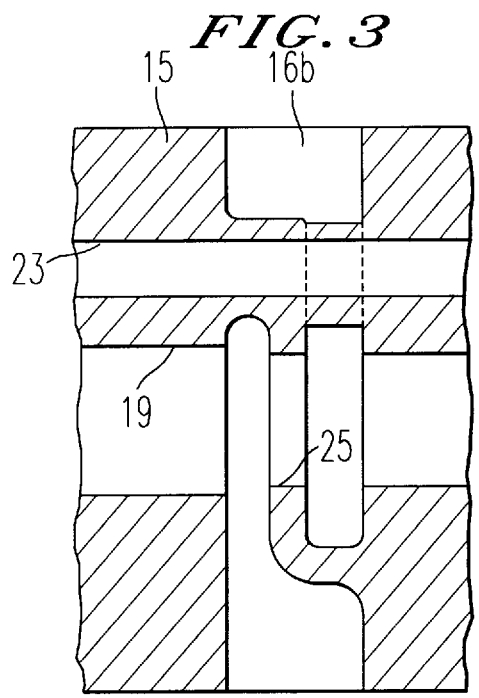
FIG. 3 is an enlarged view of FIG. 2.

The closable communication passage 16 comprises a first portion 16a in communication with the supply passage hole 5 in the base 2 and opened into the pressure-control valve hole 19; and a second portion 16b in communication with the supply passage hole 10 on the selector valve 3 side and opened into the pressure-control valve hole 19 at a position different from that in the first portion 16a, as shown in FIG. 3. The pressure-control valve seat 25 is installed at the pressure-control valve hole 19 between the first portion 16a and the second portion 16b, and a pressure-control valve member 21 provided on the pressure-control valve rod 20 opens and closes the pressure-control valve seat 25 from the first portion 16a.

Figure 4:
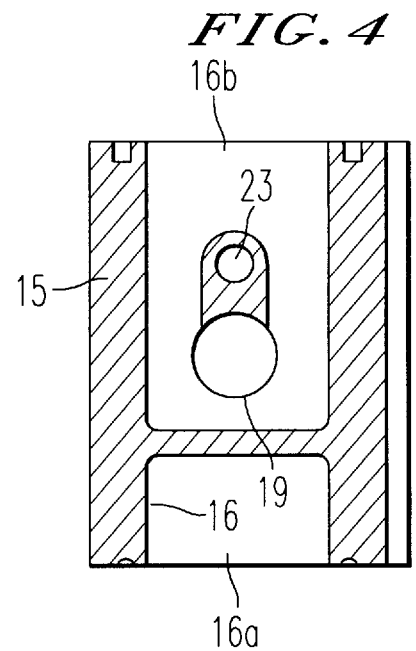
FIG. 4 is a cross-sectional view taken along line IV—IV in FIG. 2.
Figure 5:
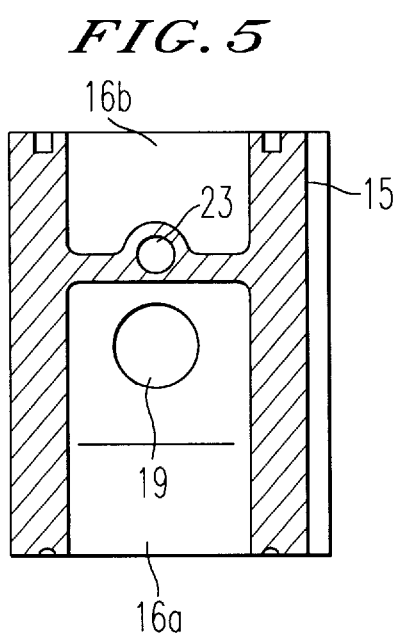
FIG. 5 is a cross-sectional view taken along line V—V in FIG. 2.
Figure 6:
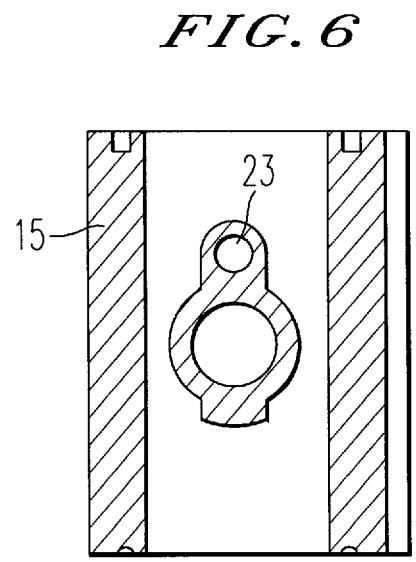
FIG. 6 is a cross-sectional view taken along line VI—VI in FIG. 2.

As shown in FIGS. 4 to 6, the pressure-control valve hole 19 is in communication with the closable communication passage 16 but not with the direct-communication passages 17A, 17B, 18A, and 18B, and penetrates the approximate middle of each direct communication passage with a required gap retained on both sides of the valve hole, with the gap allowing compressed air to flow therethrough. By forming the communication passages and the pressure-control valve hole 19 in the valve body 15 in such a way that they cross each other, they can be efficiently disposed within a small space, resulting in a valve body 15 of a reasonable design and structure.

A pressure-control section 29 is formed at one end of the valve body 15. The pressure-control section 29 includes a pressure-control chamber 38 formed between the valve body 15 and the pressure-control cover 30 so as to communicate with the pressure-control valve hole 19; a pressure-control piston 33 slidably accommodated in the pressure-control chamber 38; and a pressure-control spring installed in a spring chamber 34 between the pressure-control piston 33 and a spring seat 32 located behind the piston. The pressure-control spring 35 energizes the pressure-control piston 33 toward the pressure-control valve rod 20. The energizing force of the pressure-control spring 35 can be adjusted by moving an adjustment screw forward and backward. Reference numeral 36 is a lock nut that locks the adjustment screw 31.

The pressure-control piston 33 includes an exhaust hole 39 that is opened to the air through the spring chamber 34 and a breathing hole 40, and a relief valve member 37 that is installed at the top of the exhaust hole 39 so that the relief valve member 37 can be opened and closed by a tapered valve-closing section 41 at the tip of the pressure-control valve rod 20.

In addition, a return chamber 45 leading to the pressure-control valve hole 19 is formed between the valve body 15 and a return cover 42, and a return spring 44 that energizes the pressure-control valve rod 20 toward the pressure-control piston 33 side is provided in the return chamber 45. The energizing force of the return spring 44 is smaller than that of the pressure-control spring 35.

The return chamber 45 is in communication with a detection port 43 formed in the return cover 42 through a passage hole, and a pressure gauge attached to the detection port 43 enables the controlled air pressure to be detected.

A pressure-control passage 23 connecting the pressure-control chamber 38 to the return chamber 45 is disposed adjacent to the communication passages 16, 17A, 17B, 18A, and 18B in parallel thereto. By disposing the pressure-control valve hole 19 and the pressure-control passage 23 in such a manner, the channel cross-section area can be prevented from being reduced in size compared to the case in which the pressure-control valve hole and the pressure-control passage are disposed in parallel in the width direction of the communication passages, thereby enabling a channel cross-section of the required size to be reliably obtained.

The pressure-control valve rod 20 has an outer diameter that enables the rod to be inserted into the pressure-control valve hole 19 in such a way that a gap is formed between the outer circumference of the rod 20 and the wall of the pressure-control valve hole 19. A gap 24a extending from the second portion 16b of the closable communication passage 16 to the pressure-control chamber 38 forms a connecting channel for guiding compressed air from the second portion 16b to the pressure-control chamber 38. A gap 24b connecting the first portion 16a of the closable communication passage 16 to the return chamber 45 is sealed by a seal member 28 provided on the pressure-control valve rod 20.

In the pressure-control valve 1A of this configuration according to the first embodiment, while compressed air from supply port P in the base 2 is not being supplied to the closable communication passage 16, the energizing force of the pressure-control spring 35 causes the pressure-control piston 33 and the pressure-control valve rod 26 to be moved to the left, thereby causing the pressure-control valve member 21 to open the pressure-control valve seat 25. Then, the first portion 16a of the closable communication passage 16 communicates with the second portion 16b thereof and supply port P in the base 2 communicates with the supply passage hole 10 in the selector valve 3.

When supplied to supply port P, compressed air flows through the closable communication passage 16 into the supply passage hole 10, while simultaneously flowing through connecting channel 24a into the pressure-control chamber, 38 and further flowing through the pressure-control passage 23 into the return chamber 45. Thus, the pressure-control piston 33 is moved by the combined force of the acting force created by the air-pressure and the energizing force of the return spring 44 created by the pressure-control valve rod 20, both of which act on the piston, and is moved backward while moving the pressure-control spring 35 to a position at which the combined force and the energizing force of the pressure-control spring 35 are balanced. Once these forces have become balanced, the pressure-control valve member 21 seals the pressure-control valve seat 25 to cause the first and second portions 16a and 16b of the closable communication passage 16 to be cut off from each other.

If the force of the air pressure acting on the pressure-control piston 33 is larger than the energizing force of the pressure-control spring 35, the pressure-control piston 33 is moved further backward to open the relief valve member 37, thereby causing the compressed air in the pressure-control chamber 38 to be ejected to the exterior to maintain the balance between the force of the air pressure and the energizing force of the pressure-control spring 35.

Thus, the air pressure from the second portion 16b on the closable communication passage 16 side (the output air pressure) is adjusted to the value set by the pressure-control spring 35. The air pressure can be detected by the pressure gauge attached to the detection port 43.

The air-pressure setting can be varied by moving the pressure-control screw 31 forward and backward to adjust the energizing force of the pressure-control spring 35.

Figure 7:
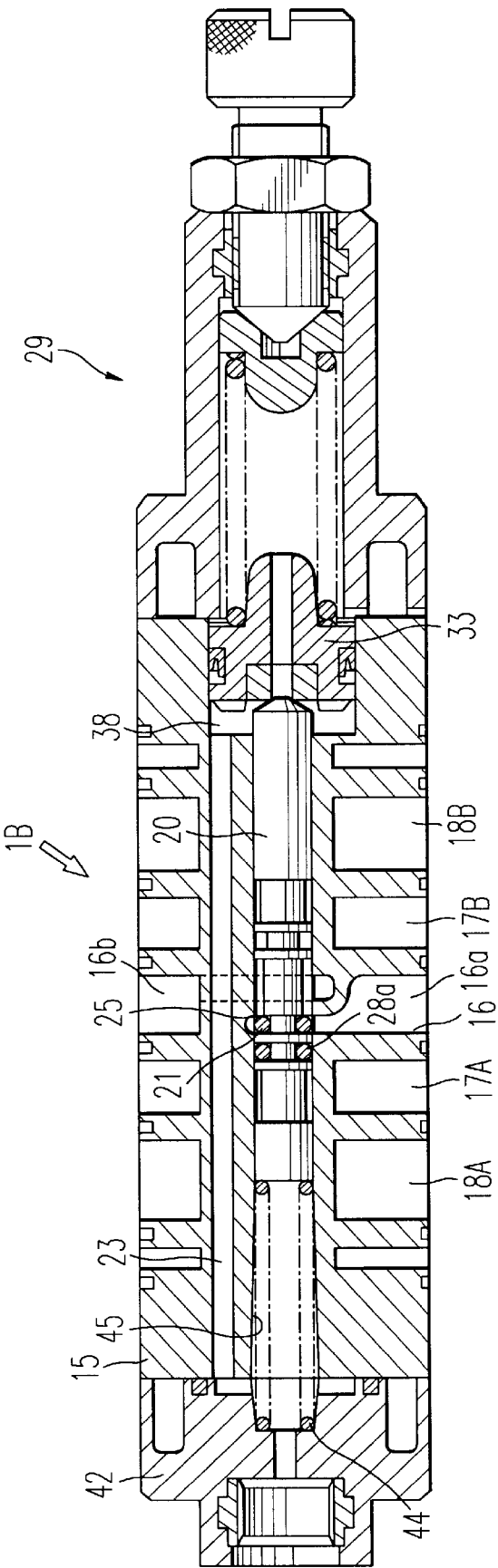
FIG. 7 is a cross-sectional view of a second embodiment of this invention.

FIG. 7 shows a second embodiment of the pressure-control valve according to this invention. The second embodiment differs from the first embodiment in that a pressure-control valve 1B uses a lip seal member 28a comprising a Y- or V-shaped cross section that has a directional seal, as opposed to the use of a non-directional O-ring in the first embodiment. The seal member 28a is mounted so as to block the flow of compressed air from the closable communication passage 16 to the return chamber 45 while allowing a counterflow. Thus, when the air pressure supplied to supply port P is released, the compressed air in the second portion 16b of the closable communication passage 16 opens the seal member 28a and is blown out of the first portion 16a, causing the pressure-control valve member 21 to immediately open the pressure-control valve seat 25, ejecting the residual pressure on the output port side.

The other configuration and effects of the second embodiment are almost the same as those of the first embodiment, so the same main components have the same reference numerals and their description is omitted.

Figure 8:
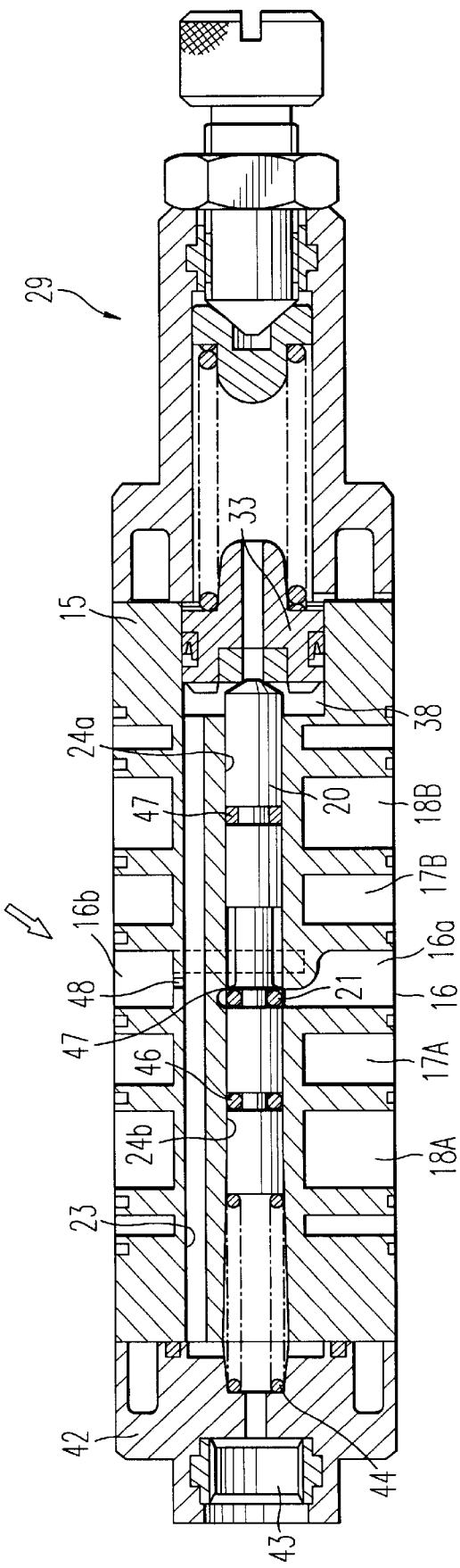
FIG. 8 is a cross-sectional view of a third embodiment of this invention.

FIG. 8 shows a third embodiment of the pressure-control valve. A pressure-control valve 1C differs from the pressure-control valve in the second embodiment in that the connecting channel for guiding compressed air for pressure control to the pressure-control chamber 38 is not formed by the gap in the outer circumference of the pressure-control valve rod 20, but by a connecting hole 48 that allows the second portion 16b of the closable communication passage 16 to directly communicate with the pressure-control passage 23. Thus, in the third embodiment, the gap 24a in the outer circumference of the pressure-control valve rod 20 that connects the second portion 16b to the pressure-control chamber 38 is sealed by a second seal member 47 installed on the pressure-control valve rod 20. In this embodiment, the first seal member 46 that seals the gap 24b between the first section 16a of the closable communication passage 16 and the return chamber 45 side uses a lip seal member that has a directional seal, and the second seal member 47 comprises a non-directional O-ring.

The other configuration and effects of the third embodiment are almost the same as those of the first embodiment, so the same main components have the same reference numerals as in the first embodiment and their description is omitted.

Figure 9:
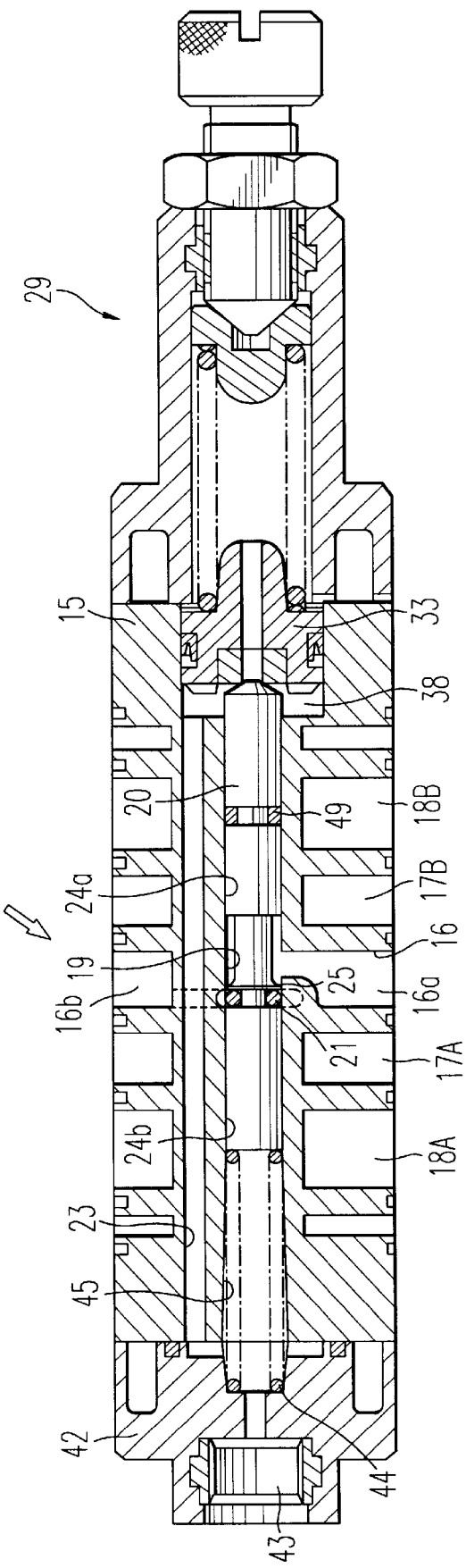
FIG. 9 is a cross-sectional view of a fourth embodiment of this invention.

FIG. 9 shows a fourth embodiment of the pressure-control valve. This pressure-control valve 1D mainly differs from the pressure-control valve in each embodiment in that the first and the second portions 16a and 16b of the closable communication passage 16 are reversely disposed in the axial direction. That is, the first portion 16a is disposed on the pressure-control chamber 38 side, whereas the second portion 16b is disposed on the return chamber 45 side, and the pressure-control valve seat 25 is opened and closed by the pressure-control valve member 21 from the second portion 16b side. The gap 24b in the outer circumference of the pressure-control valve rod 20 that connects the second portion 16b to the return chamber 45 constitutes a connecting channel so that compressed air for pressure control can be guided from the return chamber 45 to the pressure-control chamber 38 via the pressure-control passage 23. The gap 24a in the outer circumference of the pressure-control valve rod 20 that connects the first portion 16a to the pressure-control chamber 38 is sealed by a lip seal member 49 in the direction of the pressure-control chamber 38.

The other configuration and effects of the fourth embodiment are almost the same as those of the first embodiment, so the same main components have the same reference numerals as in the first embodiment and their description is omitted.

Figure 10:
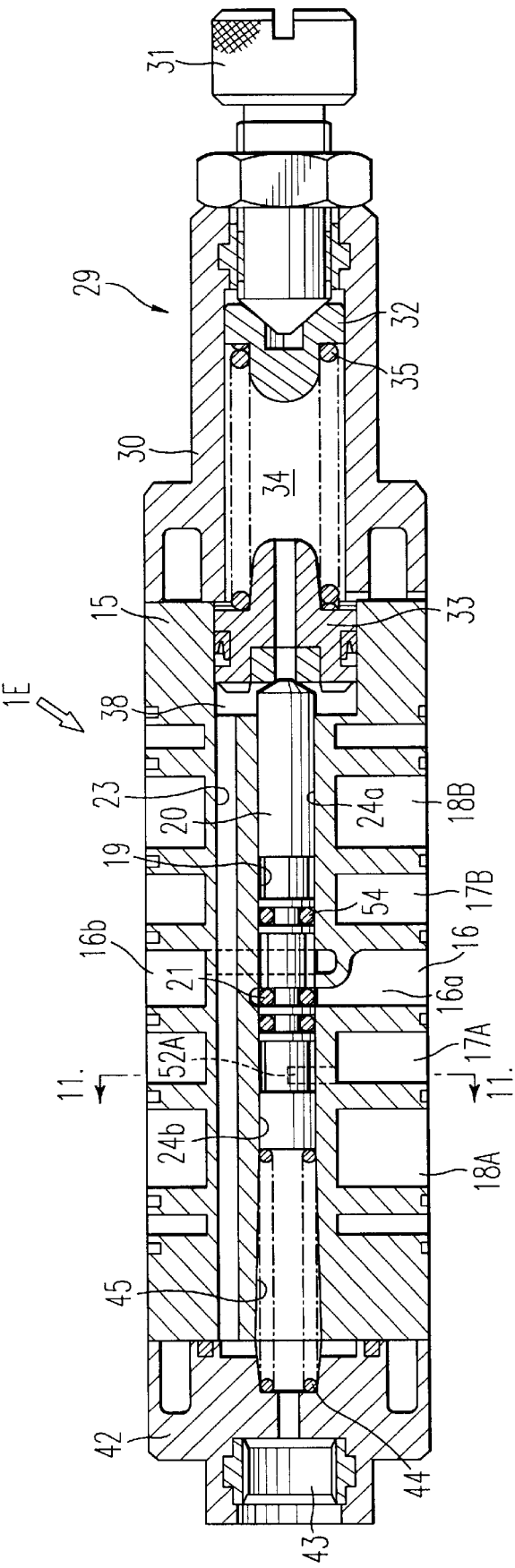
FIG. 10 is a cross-sectional view of a fifth embodiment of this invention.

FIG. 10 shows a fifth embodiment of the pressure-control valve. The pressure-control valve 1E according to the fifth embodiment differs from the pressure-control valves according to the first to fourth embodiments in that compressed air for pressure control is obtained from the output direct-communication passages. In the pressure-control valve 1E, a connecting hole 52A leading to the pressure-control valve hole 19 is formed in the output direct-communication passage 17A that connects the first output passage hole 6A in the base 2 to the first output passage hole 11A in the selector valve 3, so that compressed air for pressure control from the first output direct communication passage 17A can be guided from the return chamber 45 to the pressure-control chamber 38 via the pressure-control passage 23, as shown in FIG. 11.

The pressure-control valve rod 20 includes a first seal member 53 that seals the gap 24b at the outer circumference of the rod 20 between the first portion 16a of the closable communication passage 16 and the connecting hole 52A, and a second seal member 54 that seals the gap 24a between the second portion 16b and the pressure-control chamber 38.

As described above, the fifth embodiment differs from the other embodiments only in its introduction path for compressed air for pressure control, and the fact that operations during pressure control in the fifth embodiment is almost the same as that in the first embodiment. Thus, main components that are the same as those described above have the same reference numerals as in the first embodiment and their description is omitted.

In addition, in the fifth embodiment, the first seal member 53 may comprise a lip seal member installed so that the flow of compressed air from the first portion 16a of the closable communication passage 16 to the return chamber 45 can be blocked while allowing a counterflow. In this configuration, when the supplied air pressure in supply port P is released, the air pressure output from the first output direct-communication passage 17A opens the first seal member 53 open and is ejected to supply port P, causing the pressure-control valve seat 25 to immediately open and release the remaining pressure. In this case, the second seal member 54 may comprise a lip seal member and be disposed so that the flow of compressed air from the second portion 16b of the closable communication passage 16 to the pressure control chamber 38 can be blocked while allowing a counterflow. This configuration further improves the efficiency of releasing the remaining pressure when the supplied air pressure in supply port P is released, and reduces the sliding resistance of the first and second seal members 53 and 54, thereby improving the responsiveness of the pressure-control valve rod 20.

Figure 12:
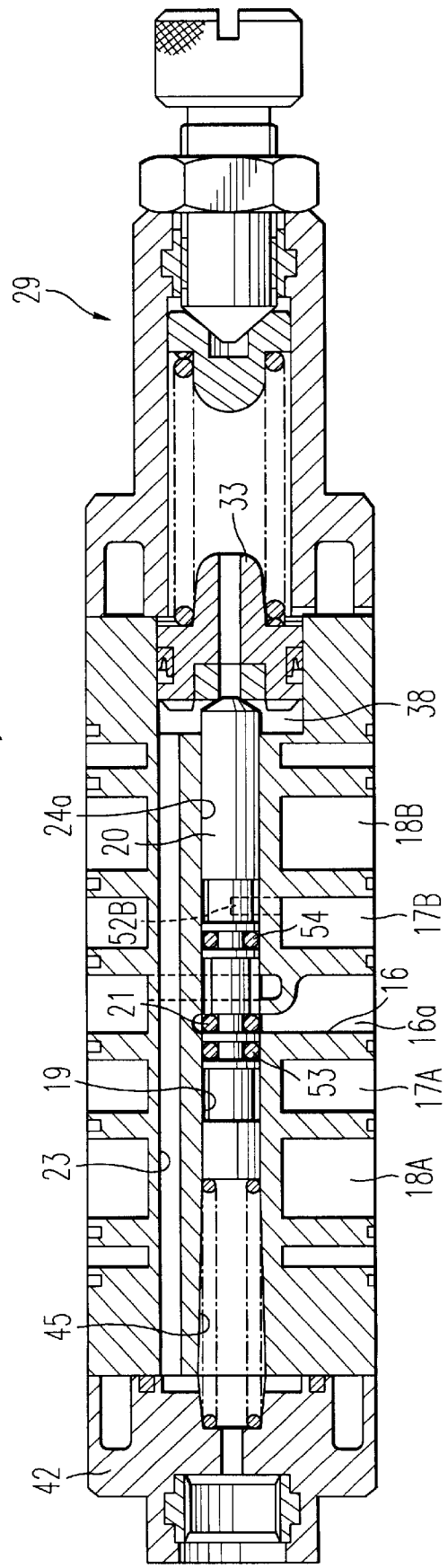
FIG. 12 is a cross-sectional view of a sixth embodiment of this invention.

FIG. 12 shows a sixth embodiment of the pressure-control valve. The pressure-control valve according to the sixth embodiment differs from the pressure-control valve 1E according to the fifth embodiment in its introduction path for compressed air for pressure control. In the pressure-control valve 1F, a connecting hole 52B leading to the pressure-control valve hole 19 is formed in the second output direct-communication passage 17B connecting the second output passage hole 16B in the base 2 to the second output passage hole 11B in the selector valve 3, so that compressed air from the second output direct-communication passage 17b can be guided to the pressure-control chamber 38 through a connecting channel comprising the connecting hole 52B and the gap 24a at the outer circumference of the pressure-control valve rod 20.

The other configuration and effects of this embodiment are almost the same as those of the fifth embodiment, so the same main components have the same reference numerals as in the fifth embodiment and their description is omitted.

In the sixth embodiment, one or both of the first and second seal members 53 and 54 may be formed of a lip seal member with a directional seal, as in the variation of the fifth embodiment. The position at which the lip seal member is installed to block the air flow and its effects are almost the same as those in the variation of the fifth embodiment.

FIG. 13 shows another example of the structure of the valve-closing section 41 at the end of the pressure-control valve rod 20 that is preferably applicable to the pressure-control valve according to each of the above embodiments. The valve-closing section 41 comprises an abutting surface 41a that abuts the end surface of the pressure-control piston 33 and that is flat and annular; and a protruding portion 41b that protrudes from the abutting surface and that opens and closes the relief valve member 37.

In this structure of the valve-closing section 41, when the pressure-control valve rod 20 is moved to the right to cause the protruding portion 41b to close the relief valve member 37, the annular abutting surface 41a abuts the end surface of the pressure-control piston 33, thereby preventing the relief valve member 37 from being excessively deformed by pressure on the valve rod.

In the pressure-control valve according to each of the above embodiments, if the direct communication passages include an output communication passage connecting the output passage hole in the base 2 to the output passage hole in the selector valve 3 and an output port is formed on the selector valve 3 side but not on the base 2 side, this output direct-communication passage need not be omitted. If it is not omitted, the base two-sided end of this communication passage is sealed by a gasket. In addition, this output direct-communication passage can be used to draw compressed air for pressure control as shown in the fifth and sixth embodiments.

On the other hand, if this output direct-communication passage is omitted and if output air is drawn into the pressure-control chamber 38 for pc, an appropriate connecting hole that allows the output passage hole 11A or 11B opened in the bottom surface of the selector valve 3 to communicate with the pressure-control valve hole 19 may be formed in the valve body 15 of the pressure-control valve so that the output air pressure can be drawn into the pressure-control chamber 38 or the return chamber 45 through a connecting passage comprising this connecting hole and the gap in the outer circumference of the pressure-control valve rod 20.

What is claimed is:

1. A pressure-control valve mounted on a base-mount selector valve for controlling fluid pressure that is mounted between a selector valve for switching the flow direction of a pressurized fluid and a base for supplying a pressurized fluid to the selector valve, comprising:

a valve body having almost the same lateral width as that of said selector valve and mounted so as to be directly positioned between the selector valve and said base;

a closable communication passage allowing a set of passage holes in said selector valve to communicate with a set of corresponding passage holes in said base via a pressure-control valve seat; and direct communication passages allowing the other corresponding passage holes in the selector valve and the base to directly communicate with each other, with said communication passages being formed in parallel in said valve body;

a pressure-control valve hole formed in said valve body so as to cross said closable and direct communication passages, with said pressure-control valve hole communicating with the closable communication passage while not communicating with the direct communication passages, and with said pressure-control valve hole including said pressure-control valve seat in part thereof;

a pressure-control valve rod movably provided in said pressure-control valve hole;

a pressure-control valve member installed on said pressure-control valve rod for opening and closing said pressure-control valve seat;

a pressure-control chamber installed at one end of said pressure-control valve rod; a pressure-control piston slidably provided in the pressure control chamber; a pressure-control spring to move the pc piston toward the pressure-control valve rod;

a return chamber installed at the other end of said pressure-control valve rod; a return spring disposed in the return chamber to move the pressure-control valve rod toward the pressure-control piston;

a pressure-control passage formed inside said valve body in parallel to said pressure-control valve hole to allow said pressure-control chamber and said return chamber to communicate with each other; and a connecting channel to guide a pressurized fluid for pressure control to the pressure-control chamber.

2. A pressure-control valve according to claim 1 wherein said pressure-control valve hole and said pressure-control passage are located adjacent to each other in the flow direction of each of said communication passages.

3. A pressure-control valve according to claim 1 or 2 wherein said closable communication passages are supply communication channels that allow the supply passage hole in the base to communicate with the supply passage hole in the selector valves, and that comprises a first portion that is in communication with the supply passage hole in the base and is opened into said valve hole; and a second portion that is in communication with the supply passage hole in the selector valve and that is opened into said valve hole at a position different from that in the first portion, with said pressure-control valve seat installed between the first and second portions.

4. A pressure-control valve according to claim 3 wherein said connecting channel comprises a gap in the outer circumference of said pressure-control valve rod, with said gap allowing the second portion of said closable communication passage to communicate with the pressure-control chamber or the return chamber.

5. A pressure-control valve according to claim 4 wherein that part of the gap in the outer circumference of said pressure-control valve rod that does not constitute said connecting channel is sealed by a seal member attached to the pressure-control valve rod.

6. A pressure-control valve according to claim 5 wherein said seal member comprises a lip seal member having a directional seal so that during a return operation, the pressurized fluid in the pressure-control or return chamber can force the seal member open and be ejected toward the first portion of the closable communication passage.

7. A pressure-control valve according to claim 3 wherein said connecting channel comprises a connecting hole that allows the output passage hole in the selector valve to communicate with the interior of the pressure-control valve hole; and a gap in the outer circumference of the pressure-control valve rod that allows the connecting hole to communicate with the pressure-control or return chamber.

8. A pressure-control valve according to claim 7 wherein said connecting hole is formed in the output direct-communication passage connecting the output passage hole in the base to the output passage hole in the selector valve.

9. A pressure-control valve according to claim 8 wherein that part of the gap in the outer circumference of said pressure-control valve rod that does not constitute said connecting channel is sealed by a seal member attached to the pressure-control valve rod.

10. A pressure-control valve according to claim 9 wherein said seal member comprises a lip seal member having a directional seal so that during a return operation, the pressurized fluid in the pressure-control or return chamber can force the seal member open and be ejected toward the first portion of the closable communication passage.

11. A pressure-control valve according to claim 7 wherein that part of the gap in the outer circumference of said pressure-control valve rod that does not constitute said connecting channel is sealed by a seal member attached to the pressure-control valve rod.

12. A pressure-control valve according to claim 11 wherein said seal member comprises a lip seal member having a directional seal so that during a return operation, the pressurized fluid in the pressure-control or return chamber can force the seal member open and be ejected toward the first portion of the closable communication passage.

13. A pressure-control valve according to claim 3 wherein said connecting channel is a connecting hole that allows the second portion of said closable communication passage to directly communicate with the pressure-control passage.

14. A pressure-control valve according to claim 13 wherein that part of the gap in the outer circumference of said pressure-control valve rod that does not constitute said connecting channel is sealed by a seal member attached to the pressure-control valve rod.

15. A pressure-control valve according to claim 14 wherein said seal member comprises a lip seal member having a directional seal so that during a return operation, the pressurized fluid in the pressure-control or return chamber can force the seal member open and be ejected toward the first portion of the closable communication passage.

* * * * *